United States Patent [19]

Chang et al.

[11] 4,314,923
[45] Feb. 9, 1982

[54] COATING COMPOSITIONS FORMULATED FROM POLYOLS MODIFIED BY REACTION WITH GLYCIDYL ETHER

[75] Inventors: Wen-Hsuan Chang, Gibsonia; Robert Piccirilli, Pittsburgh, both of Pa.; David A. Diehl, S. Milwaukee, Wis.

[73] Assignee: PPG Industries, Inc., Pittsburgh, Pa.

[21] Appl. No.: 156,529

[22] Filed: Jun. 4, 1980

[51] Int. Cl.$^3$ .................. C08L 61/28; C08L 61/24
[52] U.S. Cl. .................. 260/29.4 R; 525/509; 525/518; 260/33.2 R; 260/33.4 R; 260/32.8 N; 260/32.6 N; 260/32.4
[58] Field of Search ............ 260/29.4 R, 32.4, 32.6 N, 260/32.8 N, 33.4 R, 33.2 R; 525/509, 518

[56] References Cited

U.S. PATENT DOCUMENTS 3,267,174 8/1966 Fry et al. ...................... 260/29.4 R
3,959,201 5/1976 Chang et al. .................. 260/29.4 R
4,206,104 6/1980 Dowbenko et al. ........... 260/29.4 R
4,218,355 8/1980 Chang et al. .................. 260/29.4 R Primary Examiner—Wilbert J. Briggs, Sr.
Attorney, Agent, or Firm—Charles R. Wilson

[57] ABSTRACT

Coating compositions are formulated using a polyol with a hydroxyl functionality of at least three modified by reaction with a glycidyl ether in proportion of about 0.1 to about 4, preferably from about 0.2 to about 2 moles of glycidyl ether per mole of polyol, with which is combined, as curing agent, a compatible aminoplast resin. When the polyol is trimethylol ethane, for example, and is so modified with allyl or butyl glycidyl ether, for example, and is so modified with allyl or butyl glycidyl ether, for example, and the compositions contain a methylated melamine formaldehyde condensate as curing agent, they are especially suitable for clear top coating surfaces of wood or flat woodstock containing printing inks to simulate woodgrain, to provide a durable coating highly adherent to the inks as well as the cellulosic materials. The compositions may contain high solids content yet they are stable on storage without development of crystallization and are reducible or thinnable with water.

21 Claims, No Drawings

COATING COMPOSITIONS FORMULATED FROM POLYOLS MODIFIED BY REACTION WITH GLYCIDYL ETHER

BACKGROUND OF THE INVENTION

This invention relates to coating compositions formulated in part from certain polyols modified by reaction with a glycidyl ether. In particular, it pertains to compositions so formulated which have a relatively high solids content, which can be thinnable or reducible with water and can be completely free of water immiscible organic solvents and which are especially useful for the top coating of surfaces or rigid wood or wood-like products, such as paneling or the like, to enhance the durability and appearance thereof.

Clear topcoats for the finishing of wood and flat woodstock products used in paneling, furniture, etc. have conveniently been formulated from alkyd resins dissolved or dispersed in a non-aqueous liquid vehicle which is or contains an organic hydrocarbon solvent. In the flat woodstock industry such products are normally produced by the pressing together of cellulosic particles and chips to form a composite structure which is then treated with an appropriate sealer and printed with a suitable ink to provide a wood-like grain. A clear topcoat is then applied to the article to render its surface more attractive and to make it durable and resistant to abrasion, scratching, the action of water and solvent-based cleaners etc. The conventional organic-solvent-based alkyd resin topcoats have provided these properties and have adhered well to the wood or woodstock articles, as well as, any printing inks present therein.

However, adverse environmental effects of organic solvents, particularly hydrocarbon solvents, including air and water pollution effects, photochemical degradation effects and even adverse health effects attributed to certain hydrocarbon solvents, as well as high cost of solvents, have led the coatings industry to seek to develop aqueous coating compositions free of hydrocarbon solvents and which possess all the desirable attributes of conventional hydrocarbon solvent-based coatings.

The development of clear water-based topcoats for finishing of wood, and especially woodstock products, which are as suitable for the purpose as alkyd resin systems, has been particularly difficult for a number of reasons. The coating composition as supplied to users should be stable on storage in summer and winter without crystallization of material from the aqueous medium even in cold climate when stored outside, or increasing in viscosity. It should be of relatively high solids content but be reducible or thinnable with water to provide as thin a coating as desired. It should be capable of application to wood or woodstock paneling without gellation for many hours or phasing out from the aqueous solvent or other difficulties during conventional coating, and of being subjected after application to a rapid, relatively low temperature bake to remove the volatile components and effect a cure to the desired finished coating. The coating applied should not be blemished or marred when the paneling is stacked on itself after being coated and it should adhere to the substrate (and any printing inks present to provide wood-like grain), so tenaciously as not to be removable under any use conditions, as well as having the requisite durability and resistance.

Prior to this invention, there has been developed a specific type of water-based composition for clear topcoating of wood and woodstock products which possesses some of the desired attributes. This composition is formulated using active film-forming ingredients trimethylol ethane and a water soluble or dispersible methylated melamine-formaldehyde condensate. The trimethylol ethane functions uniquely in the composition, since other simple triols such as trimethylol propane, glycerol etc. are unsuitable. However, even this specific type of composition has been found lacking for the desired purpose. When the composition is stored at lower temperatures, undesirable crystallization sometimes occurs and then coatings applied therefrom to woodstock paneling do not possess sufficient adhesion to the substrate to pass an adhesive "tape test" to be hereinafter described.

It is also known from U.S. Pat. Nos. 3,959,201 and 3,994,581 that high solids, aqueous-solvent-thinnable coating compositions useful for a variety of purposes, but not especially designed for top coating of wood and wood-like surfaces, can be formulated in aqueous media by combining various polyols (i.e., organic materials containing a plurality of alcoholic hydroxyl groups), including trimethylol ethane, with aminoplast resins.

SUMMARY OF THE INVENTION

It has now been discovered that coating compositions remarkably suited for coating of wood and woodstock are obtained by combining with an aminoplast resin, a particular type of polyol, termed herein a "modified polyol" having a number average molecular weight below about 700 and a viscosity of less than about 20 poises at 80 weight percent concentration in water, prepared by reacting (1) a polyol having a predominant constituent in which there are three or more hydroxyl groups (2) a glycidyl ether, in critical proportions of about 0.1 to about 4 moles, preferably about 0.2 to about 2 moles of (2) per mole of (1).

Substitution of the modified polyol for trimethylol ethane in an otherwise identical high-solids water-based coating composition prevents development of undesirable crystallization on storage especially at temperatures as low or lower than 5° C. Also, quite surprisingly such substitution greatly improves the adhesion of coatings deposited therefrom to woodstock paneling containing various inks to simulate wood grain, and otherwise provides an improved and more suitable composition for the desired purpose.

DETAILED DESCRIPTION OF THE INVENTION

The instant invention is directed generically to coating compositions comprising (A) a solvent medium with a combination of film-forming or other "solids" ingredients including (B) a particular modified polyol of a number average molecular weight below about 700 and a viscosity at 80 weight percent in water of less than about 20 poises, prepared by reacting (1) a starting polyol, termed herein the "precursor polyol", having a predominant constituent containing three or more hydroxyl groups with (2) a glycidyl ether in proportions of about 0.1 to about 4 of (2) per mole of (1) and (C) an aminoplast resin compatible with (A) and (B), there being in the compositions from about 0 to about 95 weight percent of (A) based on total composition; an amount of (B) from about 20 to about 80 weight percent of the amount of (B) and (C) combined and the amount of (B) and (C) combined constituting from about 5 to about 100 weight percent of the total composition.

Such compositions may be substantially free of organic solvents, especially those more volatile than water, and are completely free of polluting hydrocarbon solvents, which makes them desirable from the environmental standpoint; they may be, and normally are formulated with high solids content to contain only about 5 to about 35 weight percent aqueous solvent, so that there is less solvent to remove which enables attainment of faster cure. In addition, removal of water is energy intensive and much less energy is required to remove water from high than from low solids compositions. However, if desired, high solids compositions may be diluted or thinned with water so as to contain as much as about 95 weight percent aqueous solvent for application to give as thin a coating as desired and they are capable on application to rigid surfaces such as wood and flat woodstock, particularly when mixed with an acid catalyst just prior to application, to being subjected to a rapid low temperature bake to remove the aqueous solvent and effect a cure through reaction between components (B) and (C).

The preferred compositions are those in which the modified polyol, component (B), is prepared from a precursor polyol which is a simple triol or higher polyol containing only carbon, hydrogen and oxygen, or these elements plus nitrogen in amide or ring structure. The preferred compositions are free from hydrolyzable groups such as ester groups which do not partake in the modification reaction with glycidyl ether and which can hydrolyze to produce undesirable hydrolysis products during storage or application, especially if acid catalyst is used.

It is theorized the modified polyol contains, due to the reaction with glycidyl ether at an hydroxyl group, structural segments represented by the formula:

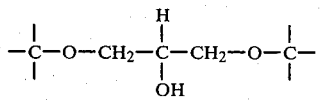

and it apparently is this structural segment which, although present in only limited amounts because of the molar ratios of reactants, is responsible for the improved adhesion to cellulosic material and printing inks, as well as the lack of crystallization, exhibited by the wood and woodstock coating composition of this invention. It is to be noted that in this structure a hydroxy group is formed to replace the hydroxyl group reacted so that the hydroxyl functionality remains unaffected; that the carbon bearing the so-formed hydroxyl group is attached to the carbon atoms of two oxymethylene, —O—CH$_2$—, groups and that the epoxy group in the glycidyl ether is not present after the reaction.

The succeeding paragraphs will describe in more detail the nature of the modified polyol component (B) including the nature of the precursor polyolpolyol and glycidyl ether reactants to be used in the modification reaction as well as the conditions for the modification reaction; the nature and source of the aminoplast resin component (C) and the formulation and application of the coating composition of this invention with the results achieved thereby.

Modified Polyol Component

As stated hereinabove, the modified polyol component (B) of the compositions of this invention has a number average molecular weight less than about 700, preferably less than about 500 when used in an aqueous medium, and a viscosity at 80 weight percent concentration in water no greater than about 20 poises, preferably below about 10 poises. More preferred modified polyols used in aqueous coating compositions have a number average molecular weight of less than about 300. It is prepared by the reaction of 1 mole of a precursor polyol of a hydroxyl functionality of at least 3 with about 0.1 to about 4 moles of a glycidyl ether. When the modified polyol is used in an aqueous composition, preferred mole ratios of glycidyl ether per mole of precursor polyol are about 0.2 to about 2, more preferably from about 0.2 to about 1.5. The precursor polyol is obviously selected so that the modified polyol will have the proper molecular weight and viscosity but, consistant with these criteria, a considerable number of precursor polyols may be used. The precursor polyol may consist of a single chemical compound, or mixtures of chemical compounds so long as the predominant constituent has a hydroxyl functionality of three or more.

Examples of precursor polyols for the glycidyl ether modification reaction include, as a preferred class, polyols of the structure R—(OH)$_n$ where n is at least 3, preferably 3 to 5, and R is aliphatic hydrocarbon structure having simple triols, such as trimethylol ethane, (TME), trimethylol propane, glycerol, 1,2,4-butane triol, 1,2,6-hexane triol etc.; mixtures of such triols with each other; higher polyhydric alcohols such as erythritrol, arabitol, xylitol, adonitol, D-threitol, 1-threitol, sorbitol, dulcitol, D-mannitol, diglycerol and mixtures thereof or with the above triols. Mixtures of polyols of the above class with lesser amounts of diols of the structure R—(OH)$_2$ where R is hydrocarbon or oxyhydrocarbon, may also be used as the precursor polyol especially for the purpose of providing a modified polyol component which cures with the aminoplast resin to give a somewhat more flexible coating. Examples of such diols include ethylene glycol, 1,2-propane diol, 1,3-propanediol, 1,2-butanediol, 1,4-butanediol, 1,5-pentanediol, 1,6-hexanediol, 2-ethyl-1,3-hexanediol, 1,2-cyclohexanediol, 1,2-bis (hydroxyethyl) cyclohexane, butene-2 diol, diethylene glycol, triethylene glycol, tetraethylene glycol, 2,2-bis-(betahydroxyethoxyphenol) propane, etc.

Another class of precursor polyols which can be used in the glycidyl ether modification reactions to produce the modified polyol component of the composition of this invention are those compounds having a hydroxyl functionality of 3 to 6 and containing, in addition to carbon, hydrogen and oxygen in hydroxyl groups, one or more other oxygen atoms present in ether linkages or attached to carbon in a ring structure and/or one or more nitrogen atoms present in a ring structure. Examples of such compounds include tris (hydroxyethyl) isocyanurate (THEIC) of the structure:

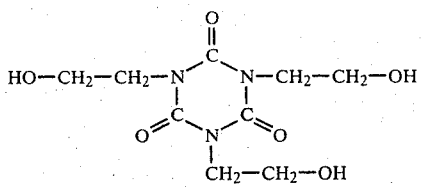

and 1,4-bis (4,4 bis (hydroxymethyl) 1,3-oxazole-2-ene-2yl) butane, which is formed by reaction of one mole of adipic acid and two moles of NH₂—C—(CH₂OH)₃ and has the structure:

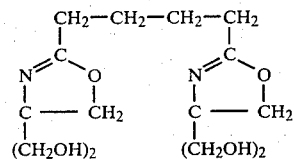

Still other polyols contemplated as precursor polyols in preparation of the modified polyol component of the compositions of this invention are those with a hydroxyl functionality of 3 to 5 and, in addition to carbon, hydrogen and oxygen in OH groups, contain nitrogen, wherein the nitrogen-containing precursor polyol is an amide or imide polyol structure, and/or nitrogen which is a part of a ring structure, still other oxygen or nitrogen atoms present in ester linkages or amide linkages. Many of the polyester polyols, polyester polyol oligomers and polyamide polyol oligomers disclosed in U.S. Pat. No. 3,959,201 are of this nature, but because polyester polyols contain hydrolyzable groups they are not preferred for use in preparing the wood coating compositions of this invention.

To prepare the modified polyol component, the precursor polyol is reacted with a glycidyl ether in the stated critical proportions. Reaction occurs between a hydroxyl group of the precursor polyol and an epoxy group of the glycidyl ether to produce the modified polyol having the structural segments set forth hereinabove. In the simplest, but a preferred, instance where the precursor polyol is TME and the glycidyl ether is a monoglycidyl ether of the structure 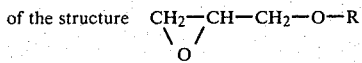

where R is a hydrocarbon radical of 1 to 12 carbon atoms, the reaction proceeds to a substantial extent as indicated in the following equation:

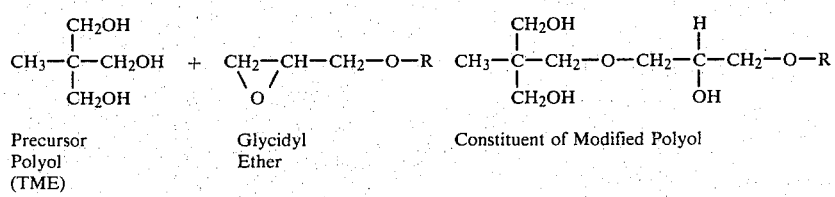

Precursor Polyol (TME)  Glycidyl Ether   Constituent of Modified Polyol

Of course, the constituent shown in the equation is not the sole constituent of the modified polyol since it is possible for reaction to occur at more than one of the OH groups in the precursor polyol. Moreover, since there is used in the reaction a maximum of two moles of glycidyl ether per mole of polyol and there is a minimum of three hydroxyl groups in the major constituent of the precursor polyol (three OH groups in the TME illustrated), it follows that the modified polyol will contain much of the starting precursor polyol but will have constituents, in amounts dependent on the mole ratio of glycidyl ether used, which can be as little as 0.1 mole per mole of precursor polyol, containing the characteristic

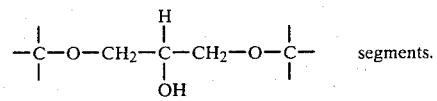 segments.

Furthermore, since any hydroxyl can react with glycidyl ether, the latter is substantially completely consumed during the reaction and the modified polyol is essentially free of residual epoxy,

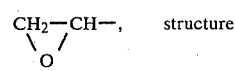 structure from the starting glycidyl ether.

The molar proportion of glycidyl ether reacted with the precursor polyol is of critical importance in preparing the modified polyol. If less than 0.1 mole of glycidyl ether per mole of precursor polyol is used, the modified polyol contains too few of the indicated structural segments to make it more suitable than the starting polyol as a component of wood coating compositions. On the other hand, if more than about 4 moles of glycidyl ether is used per mole of precursor polyol, the modified polyol can be of too high a molecular weight and/or too viscous in nature.

As noted above, the glycidyl ether reacted with the precursor polyol is preferably a mono-glycidyl ether of the formula 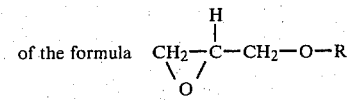

wherein R is a monovalent hydrocarbon radical containing 1 to 12 carbon atoms including alkyl radicals such as, methyl, ethyl, propyl, isopropyl, butyl, octyl, 2-ethylhexyl etc; alkenyl radicals such as allyl and similar radicals derived from unsaturated aliphatic alcohols such as methylvinylcarbinol, allylcarbinol, vinylethylcarbinol, beta-allylethyl alcohol etc. and also cycloalkyl radicals such as cyclohexyl, and aryl radicals such as phenyl. Alkenyl glycidyl ethers, especially allyl glycidyl ether and alkyl glycidyl ethers, especially butyl glycidyl ether, are most preferred for use in preparing the modified polyol. However, diglycidyl ethers such as, for example, butane diol diglycidyl ether (available from Ciba-Geigy as "RD-2") or the like can also be used especially in a ratio of about 0.1 to about 1 mole per mole of precursor polyol.

Reaction between the precursor polyol and glycidyl ether to produce the modified polyol is carried out by heating the reactants in the molar proportions indicated to a temperature generally in the range of about 25° C. to 170° C., preferably in the presence of a catalyst such as boron trifluoride etherate, benzyl dimethyl amine, p-toluene sulfonic acid or some other Lewis acid or base or a Bronstead acid, as is well known to the art. The particular temperature used for the reaction varies with the particular catalyst used.

The modified polyols obtained from the reaction are of a resinous nature, but must have the requisite molecular weight and preferably be compatible with water and aqueous solvents used in the formulation. They are preferably mixed with aqueous solvent and aminoplast resin to form the coating compositions of this invention.

The Aminoplast Resin Component

The aminoplast resin film-forming component, which is formulated with the modified polyol film-forming component in the composition of this invention to function as a crosslinking or curing agent, may be any of the well-known condensation products of an aldehyde with an amine, and its exact nature, aside from compatibility with the aqueous system, is not critical. The methylated melamine-formaldehyde condensation products in which at least a portion of the methylol groups derived from the formaldehyde are etherified with methanol are the preferred aminoplast resins for use in this invention, particularly those in which the free methylol content is in the order of about 0.1 percent to about 15 percent.

It is to be understood, however, that compatible aminealdehyde condensation products produced from melamine and aldehydes other than formaldehyde, including acetaldehyde, crotonaldehyde, acrolein, furfural etc. and/or from formaldehyde or other aldehyde and certain amines other than melamine, including urea, benzoguanamine, triazines etc. and their alkyl and aryl substituted derivatives, as well as alkyl and aryl substituted melamines, can be substituted, in whole or part, for the preferred melamineformaldehyde condensation products. Such materials may also have the alkylol groups therein etherified in whole or in part by reaction with methanol, ethanol or other lower alcohol.

Such aminoplast resins are produced from the amine and aldehyde in a manner well-known to the art using acidic or basic catalyst with varying conditions of time and temperature. The aldehyde is often employed as a solution in water or alcohol, with the condensation, polymerization and etherification reactions being carried out either sequentially or simultaneously.

Well-known, commercially available, aminoplast resins which may be and are preferably used include the materials supplied by American Cyanamid Company under the trade name "Cymel"; "MM83" supplied by Rohm and Hass and "Resimine U980" supplied by Monsanto Company.

Formulation and Application of Coating Compositions

The coating compositions of this invention are prepared by thoroughly admixing the modified polyol, the aminoplast resin and, where applicable, the solvent medium. For example, the modified polyol may be blended with all or a portion of the solvent medium before addition of the aminoplast resin or the aminoplast resin may be blended with the modified polyol before addition of the solvent medium. The last procedure is preferred in instances where the aminoplast resin is not compatible with water without the presence of the modified polyol. In either event, the compositions are homogeneous having the film-forming ingredients uniformly dissolved or dispersed in the solvent medium.

The proportions of the above components can be varied to provide the desired solids content in the compositions and to influence the properties of the coating after cure. For example, relatively higher levels of modified polyol result in somewhat softer and more extensible coatings while harder more resistant coatings are obtained by increasing the proportion of aminoplast resin. In general, the amount of aminoplast resin is from about 20 to about 80 weight percent, preferably about 35 percent to about 65 percent, of the total of modified polyol plus aminoplast resin and the total of these two film-forming ingredients is from about 5 weight percent to about 100 weight percent of the total composition.

The compositions can be solvent-free, but preferably are formulated with a solvent at a level of from about 5 percent to about 95 percent, by weight of the composition. The solvent medium is an aqueous solvent medium or an organic solvent medium.

The aqueous solvent medium, comprises at least about 10 percent by weight of water, preferably at least about 40 percent by weight and most preferably at least about 75 percent by weight, with the balance, if any, being a conventional organic solvent which is compatible or miscible with the system such as ethyl cellosolve, butyl cellosolve, ethanol, butanol, methyl ethyl ketone, methyl isobutyl ketone, cyclohexanone, acetamide, pyrrolidone etc. and combinations thereof. It is possible that a minimum amount (i.e. less than about 5 percent by weight) of water-immiscible solvent such as toluene be present but this adds nothing to the desirability of the compositions and in fact detracts therefrom because of the adverse environmental effects of hydrocarbons. Preferably, the aqueous solvent medium is water alone or a mixture of water with a lesser amount of less volatile, i.e., higher boiling water miscible solvents such as ethyl or butyl cellosolves. The amount of aqueous solvent medium in "high solids" compositions, before dilution or thinning, is from about 5 to about 60 weight percent of the entire compositions. The above organic solvents can also be used alone as the solvent medium as above discussed.

In addition to the components above, the compositions of this invention may contain other optional ingredients such as emulsifiers, surfactants, plasticizers, antioxidants, flow control agents, fillers, gloss-controlling agents, etc. Pigments are not ordinarily used when the compositions are formulated for the desired purpose of forming clear top-coatings for woodstock panels and the like, but can be present without departing from the invention. It is desirable that clear top-coatings, and other compositions for other purposes, contain a minor proportion of a silicone to improve the weatherability and other properties of the resulting film.

Before use, an acid catalyst is normally included in the coating compositions of this invention to aid in curing the applied coating by decreasing the cure time and/or lowering the curing temperature. For this purpose any of various well-known organic and inorganic acid catalysts such as methane sulfonic acid, para-toluene sulfonic acid, phosphoric acid, sulfuric acid etc. may be used. The acid catalyst is preferably added to the aqueous coating compositions just prior to application to the substrate in an amount from about 0.5 weight percent to about 15 weight percent based on total composition. The compositions of this invention with the acid added, do not "set up" during application and thus possess adequate "pot life".

The compositions of this invention can be applied to the surface of the substrate, preferably flat woodstock, by any convenient method, including brushing, dipping, hot spraying, and direct roll coating. The compositions are preferably applied on rigid wood or wood-like substrates, whether or not paper coated, but useful coatings can also be applied over glass, metal, plastics, and even cloth. The amount applied can be adjusted over a wide range but when coating flat woodstock the amount is generally such as to produce a dry film thickness of the range of about 0.1 to about 0.5 mils or more.

The applied coating on the substrate is cured at temperatures in the range of about 20° C. to about 180° C. for a period of several seconds to several hours depending on the method of application, film thickness etc. When curing coated woodstock panels, the panels are normally run through a 12 meter oven heated to about 180° C. with high air velocity at a rate of about 15–45 meters per second to produce a board temperature of about 70°–95° C. and are stacked on one another while still hot.

The coatings produced from the coating compositions of this invention, particularly coatings on flat woodstock, are remarkably superior to those produced from the heretofore known aqueous solvent-based compositions. Coated woodstock panels are tack free; they do not contain blemish marks after stacking and the coatings adhere tenaciously to the substrate. The coatings are quite durable as indicated by their scratch resistance, abrasion resistance, solvent resistance, imprint resistance, washability etc.

The invention will further be described in connection with several examples which follow. The results obtained using the coating compositions of the invention in certain examples will be compared with those obtained from other coating compositions to show the unexpected advantages of the invention. The examples, in which all parts are by weight unless otherwise indicated, are illustrative and are not to be construed as limiting the invention to their specific details.

EXAMPLE 1

This Example describes the preparation of a modified polyol especially suitable as a film-forming component in the compositions of this invention from trimethylol ethane and allyl glycidyl ether; the formulation of that component into a preferred aqueous coating composition of this invention and the application thereof to woodstock paneling to produce an excellent clear top coating thereon.

One mole (120 parts) of trimethylol ethane (TME) is mixed with 0.5 mole (57 parts) of allyl glycidyl ether (AGE) and the mixture heated to a temperature of 130° C. to form a homogeneous liquid mixture. There is the slowly added 0.18 part (0.1%) of boron trifluoride etherate, as a catalyst for the reaction, whereby an exothermic reaction occurs and the temperature of the reaction mixture rises to about 170° C. The reaction is held at a temperature of 130° to 150° C. for a period of 4 to 5 hours whereby the reaction proceeds substantially to completion as evidenced by testing to determine the presence of unreacted epoxy groups in the glycidyl ether. When the test indicates the epoxy equivalent is greater than 20,000, i.e., less than 1 epoxy gram equivalent per 20,000 grams or more of reaction product, the reaction is considered complete. The modified polyol reaction product is a liquid having a number average molecular weight of 177. It is composed in part of unreacted TME and in part of other constituent compounds in which one or more of the hydroxyl groups of the TME is reacted with the epoxy group of the AGE to form a structure:

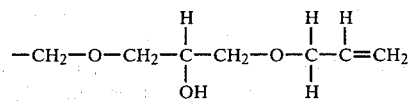

The above modified polyol—the reaction product of TME and AGE—is mixed with water to give a solution containing 20% water and 80% modified polyol. The solution has a viscosity of less than 10 poises. The modified polyol is formulated into a coating composition as follows:

| Ingredient | Parts by Weight |
|---|---|
| Modified Polyol (above reaction product of TME and AGE) | 99.58 |
| Methylated Melamine Formaldehyde Condensation Product(1) | 97.17 |
| Water | 77.25 |
| Ethyl Cellosolve | 24.33 |
| Diisopropanolamine | 0.50 |
| Silicone antimar agent(2) | 6.80 |

(1)Free methylol content of about 1.5% available from American Cyanamid Co. as "Cymel 303"
(2)Byk-Mallincrodt Co.'s "Byk 301"

This composition is stable on storage for long periods of time without crystallization of solids therefrom and is dilutable or thinnable with amounts of water up to several times the amount of water present.

The above composition is used as a clear topcoating for woodstock paneling as follows. The panels are flat lauan panels prepared by pressing together lauan chips, treating with an emulsion filler, an emulsion basecoat and nitro-cellulose inks to simulate wood grain. The coating composition is mixed with 7 percent of a 70 percent solution of a strong acid catalyst such as methane sulfonic acid in water, directly before being used to coat the panels. After so mixed with acid, the composition remains fluid, does not "set up" and hence exhibits good "pot life". The panels are coated by direct roll coating to give dry film thickness of about 0.1 mil. Films are cured for 15–20 seconds at 180° C. in a Transco high air velocity oven. As the panels leave the oven the surface temperature is 70°–95° C. The panels are stacked one on the other as they leave the oven.

The coated panels have a clear, hard, durable finish; the finish is not marred or blemished despite the stacking of the panels. When a drop of methyl ethyl ketone is placed on one of the panels and left for 30 seconds and then wiped off, no softening of the film occurs thereby indicating its chemical resistance.

Further, the excellent adhesion of the coating to the surface is demonstrated by the coating "passing" the rigorous "tape test" for determining the degree of adhesion of a coating to a wood or wood-like surface. In the test the coated panel is first cross hatched by cutting with a knife into one-eighth inch squares. A piece of masking tape of type 250 supplied by 3M Company is firmly pressed onto the surface of the coated panel and the tape then pulled off as rapidly as possible. The coating is considered to "fail" the test if any part of the coating comes off with the tape.

When the above example is repeated except for the use, instead of the modified polyol described, of unmodified TME alone, the coating composition develops a crystallization instantly when stored at 10° C. and the resultant coating "fails" the "tape test". Other coatings identical with that of the above described Example except for using in place of the modified polyol other unmodified polyols, including a mixture of 75 and 80 percent TME with 25 and 20 percent neopentyl glycol, and a mixture of 80 percent TME and 20 percent propylene glycol, also are found to "fail" the "tape test". These comparisons demonstrate the unexpected superiority of the compositions of this invention formulated with the indicated modified polyol.

EXAMPLE 2

Example 1 is repeated except that the coating composition contains a methylated melamine condensate in which the free methylol content is about 10 percent available as ∓Cymel 350", as a substitute for "Cymel 303". The results of its application are unchanged by the substitution.

EXAMPLES 3 THROUGH 13

In these Examples, Example 1 is again repeated using as the modified polyol component of the coating composition, instead of the modified polyol described (prepared from 1 mole of TME reacted with 0.5 mole of AGE) various other modified polyols. These have the properties indicated in Table I and are prepared by reacting various starting (or precursor) polyols with various glycidyl ethers in various proportions as also indicated in Table I.

TABLE I

| | Properties of Modified Polyol | | Preparation of Modified Polyol From: | | Moles |
|---|---|---|---|---|---|
| Example | No. Ave. M.W. | Viscosity 80% in water (poises) | Starting Polyol | Glycidyl Ether | Glycidyl Ether per Mole Polyol |
| 3 | 305 | <0.5 | TME | AGE | 1.63 |
| 4 | 164 | 1.5 | TME | MGE | 0.5 |
| 5 | 185 | 0.7 | TME | BGE | 0.5 |
| 6 | 193 | 2.1 | TME | BGE | 0.565 |
| 7 | 169 | 1.2 | TME | BGE | 0.375 |
| 8 | 153 | 1.1 | TME | BGE | 0.25 |
| 9 | 264 | 1.3 | TMP | BGE | 1.0 |
| 10 | 203 | 0.6 | TMP | PGE | 0.465 |
| 11 | 122 | 0.9 | TME | PGE | 0.415 |
| 12 | 442 | 3.2 | TME | BDDGE | 0.5 |
| 13 | 212 | <0.5 | SB | AGE | 0.26 |

TMP = Trimethylol propane
MGE = Methyl glycidyl ether
BGE = Butyl glycidyl ether
PGE = Phenyl glycidyl ether
BDDGE = Butane diol diglycidyl ether
SB = Sorbitol The compositions of these Examples, like the composition of Example 1, do not crystallize in storage and give tightly adherent coatings on the paneling which "pass" the tape test, although it is noted that the coating from Example 8 using the lowest ratio of TME to BGE appears to only marginally pass the test as compared to the coatings from Examples 5 to 7.

EXAMPLE 14

A coating composition similar to that described in Example 9 is prepared in which the modified polyol has a comparable number average molecular weight of 265 and a viscosity at 80% in water of 1.2 poises but is prepared by the reaction of a mixture of 1 mole of trimethylol propane (a triol) and 1 mole of hexanediol (a diol) with a mixture of 0.87 mole allyl glycidyl ether (AGE) and 0.25 mole of butane diol diglycidyl ether. This coating composition deposits on a substrate clear adherent films which have a greater flexibility than those deposited from the composition of Example 9. Another composition, however, in which hexanediol alone is used as the starting polyol (instead of the mixture with trimethylol propane) and is similarly modified with allyl glycidyl ether, gives films which are not cured well, thereby indicating that a starting polyol with a constituent having a hydroxyl functionality of at least 3, instead of only a constituent with a hydroxyl functionality of 2, is desired, although a starting polyol mixture of triol with diol imparts a higher degree of flexibility to the deposited film than when the starting polyol is all triol.

What is claimed is:

1. A coating composition comprising (A) a solvent medium (B) a modified polyol component having a number average molecular weight below about 700 and a viscosity of less than about 20 poises, at 80 percent concentration in water, derived by the reaction of (1) a precursor polyol in which the predominant constituent contains at least three hydroxyl groups with (2) a glycidyl ether, in a molar ratio of about 0.1 to about 4 moles of (2) per mole of (1) and (C) an aminoplast resin compatible with (A) and (B); the amount by weight of (A) being from about 0 to about 95 percent of the total composition; the amount by weight of (B) and (C) combined being from about 5 to about 100 percent of the total composition and the amount by weight of each of (B) and (C) being from about 20 to about 80 percent of the amount of (B) and (C) combined.

2. The composition of claim 1 wherein (A) represents from about 5 percent to about 95 percent of the composition and contains at least about 10 percent water.

3. The composition of claim 2 wherein at least 40 weight percent of (A) is water and the number average molecular weight of (B) is below about 500.

4. The composition of claim 3 wherein the amount of (B) and (C) combined is from about 40 to about 95 weight percent of the total composition.

5. The composition of claim 1 wherein (A) represents from about 5 percent to about 95 percent of the composition and is an organic solvent.

6. An aqueous coating composition for top coating of wood and simulated wood products comprising (A) an aqueous solvent medium which is water or a mixture of water with a lesser amount of a water-miscible solvent less volatile than water (B) a modified polyol component having a number average molecular weight below about 500 and a viscosity of less than about 10 poises, at 80 percent concentration in water, derived by the reaction of (1) a precursor polyol in which the constituents are composed of carbon, hydrogen, and oxygen, or these elements plus nitrogen, wherein the nitrogen-containing precursor polyol is an amide or imide polyol, and in which the sole or predominant constituent is a polyol having 3 to 6 hydroxyl groups with (2) a glycidyl ether of the formula 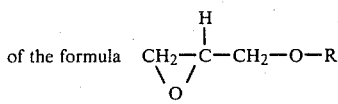

wherein R is a hydrocarbon radical of 1 to 12 carbon atoms, in a molar ratio of about 0.2 to about 2.0 moles of (2) per mole of (1) and (C) an aminoplast resin compatible with (A) and (B); the amount by weight of (A) being from about 5 to about 35 percent of the total composition, the amount by weight of (B) and (C) combined being from about 40 to about 95 percent of the total composition and the amount by weight of (C) being from about 20 to about 80 percent of (B) and (C) combined.

7. The composition of claim 6 wherein the precursor polyol is of the formula $R(OH)_n$ wherein n is 3 to 5 and R has an aliphatic hydrocarbon structure.

8. The composition of claim 7 wherein the precursor polyol is a triol.

9. The composition of claim 8 wherein the precursor polyol is trimethylol ethane.

10. The composition of claim 6 wherein the precursor polyol is a mixture of a triol of the formula $R(-OH)_3$ where R has an aliphatic hydrocarbon structure with a lesser amount of a diol of the formula $R(OH)_2$ wherein R has an aliphatic hydrocarbon structure.

11. The composition of claim 6 wherein R in the formula of the glycidyl ether is an alkenyl radical.

12. The composition of claim 11 wherein the glycidyl ether is allyl glycidyl ether.

13. The composition of claim 6 wherein R in the formula of the glycidyl ether is an alkyl radical.

14. The composition of claim 13 wherein the glycidyl ether is butyl glycidyl ether.

15. The composition of claim 6 wherein the precursor polyol is a triol of the formula $R(OH)_3$ where R is aliphatic hydrocarbon and the glycidyl ether is of the formula 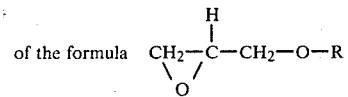

wherein R is an alkenyl radical of 2 to 5 carbon atoms.

16. The composition of claim 15 further characterized in that the aminoplast resin is a methylated melamine-formaldehyde condensate having a free methylol content of about 0.1 to about 15 percent.

17. The composition of claim 16 wherein the precursor polyol is trimethylol ethane and the glycidyl ether is allyl glycidyl ether.

18. The composition of claim 6 to which is added, prior to application thereof to a wood or woodstock surface to produce a coating thereon, from about 0.1 to about 15 weight percent based on the composition of a strong acid catalyst, thereby to promote a curing reaction between the modified polyol and the aminoplast resin in the applied coating during removal of the aqueous solvent.

19. The composition of claim 18 wherein the catalyst is methane sulfonic acid or para-toluene sulfonic acid.

20. The composition of claim 6 wherein the precursor polyol is free of hydrolyzable groups.

21. The composition of claim 20 wherein the precursor polyol is free of ester groups.

* * * * *